(12) United States Patent
Bhargava et al.

(10) Patent No.: US 12,737,489 B2
(45) Date of Patent: Sep. 15, 2026

(54) DETERMINING LOCAL ADMINISTRATOR RIGHTS-RELATED DEPENDENCY RELATIONSHIPS USING ARTIFICIAL INTELLIGENCE TECHNIQUES

(71) Applicant: Dell Products L.P., Round Rock, TX (US)

(72) Inventors: Vivek Bhargava, Bangalore (IN); Mayank Kapoor, Bangalore (IN); Furkan Mohd Nisar, Ambedkar Nagar (IN); Dinesh Koppada, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 301 days.

(21) Appl. No.: 18/436,477

(22) Filed: Feb. 8, 2024

(65) Prior Publication Data

US 2025/0258948 A1 Aug. 14, 2025

(51) Int. Cl.
*G06F 21/62* (2013.01)

(52) U.S. Cl.
CPC ................................ *G06F 21/6218* (2013.01)

(58) Field of Classification Search
CPC .................................................. G06F 21/6218
USPC ........................................................... 726/30
See application file for complete search history.

(56) References Cited

U.S. PATENT DOCUMENTS 8,819,771 B2 8/2014 Biazetti et al.
11,831,729 B2 * 11/2023 Herzog ................... H04L 67/34
12,288,271 B1 * 4/2025 Labrecque ........... G06Q 50/186
2005/0257244 A1 * 11/2005 Joly ...................... G06F 21/604
726/1
2007/0186102 A1 * 8/2007 Ng ...................... G06F 21/6227
713/165
2007/0214494 A1 * 9/2007 Uruta .................... G06F 21/608
726/2
2008/0022368 A1 * 1/2008 Field ..................... H04L 63/102
726/4
2008/0120686 A1 5/2008 Gao et al.
2010/0054433 A1 3/2010 Gustave
(Continued)

FOREIGN PATENT DOCUMENTS

EP 1927929 A1 6/2008

*Primary Examiner* — Dereena T Cattungal
(74) *Attorney, Agent, or Firm* — Ryan, Mason & Lewis, LLP

(57) ABSTRACT

Methods, apparatus, and processor-readable storage media for determining local administrator rights-related (LAR-related) dependency relationships using artificial intelligence techniques are provided herein. An example computer-implemented method includes obtaining data pertaining to multiple actions performed across one or more software applications by one or more user devices; determining one or more action dependency relationships associated with at least one action performed by a given one of the user devices in connection with a given one of the software applications, by processing at least a portion of the obtained data using artificial intelligence techniques; modifying one or more LARs, granted for the given user device, to permit access to the given user device to perform one or more actions in connection with at least one of the software applications in accordance with the determined action dependency relationship(s); and performing one or more automated actions based on the modifying of the LAR(s).

20 Claims, 6 Drawing Sheets

(56) References Cited

U.S. PATENT DOCUMENTS

| | | | | |
|---|---|---|---|---|
| 2011/0126192 | A1* | 5/2011 | Frost | G06F 8/61 717/178 |
| 2014/0059651 | A1 | 2/2014 | Luster | |
| 2017/0214695 | A1* | 7/2017 | Chachar | G06F 3/14 |
| 2018/0337906 | A1* | 11/2018 | Spektor | G06F 21/33 |
| 2019/0073385 | A1 | 3/2019 | Zheng | |
| 2020/0128018 | A1 | 4/2020 | Kumaraswamy | |
| 2020/0267006 | A1* | 8/2020 | Nyman | H04L 63/062 |
| 2021/0258208 | A1 | 8/2021 | Sharma | |
| 2022/0276859 | A1 | 9/2022 | Brevoort | |
| 2023/0379324 | A1 | 11/2023 | Gills | |
| 2024/0129341 | A1 | 4/2024 | Badana et al. | |
| 2024/0137372 | A1* | 4/2024 | Leung | H04L 63/1416 |
| 2024/0144049 | A1 | 5/2024 | Cheng | |
| 2024/0144676 | A1 | 5/2024 | Arroyo | |
| 2024/0362349 | A1* | 10/2024 | Babani | G06F 21/6218 |
| 2025/0103795 | A1 | 3/2025 | Santra | |
| 2025/0125041 | A1* | 4/2025 | Zoldan | G06Q 30/018 |
| 2025/0258948 | A1 | 8/2025 | Bhargava et al. | |

* cited by examiner

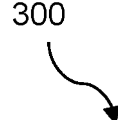

1) Collect raw logs of user activity
2) Preprocess and clean the user logs to create chain of user actions
3) For each user in a group recover chain of user actions across the group
4) Create N-gram combinations using the chain of user actions in a two minute to a five minute time window
5) Split the combinations by user persona
6) Create a consolidated list of chained user actions (e.g., Action A --> Action B)
7) Train a supervised classification model to predict the next probable action given the previous actions
8) Use the predicted set of actions to determine local admin rights disbursal

FIG. 3

DETERMINING LOCAL ADMINISTRATOR RIGHTS-RELATED DEPENDENCY RELATIONSHIPS USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Commonly, a multitude of actions and/or events can occur after a user has obtained certain local administrator rights (LAR) access in connection with a given system and/or device. Such actions and/or events can be related, for example, to enterprise processes, infrastructure management (e.g., downloading additional and/or recommended software, performing one or more recovery steps, and/or managing one or more processes and/or system components), etc., and such actions and/or events are assumed and/or assigned to be carried out by the user. However, at least a portion of such actions and/or events may be outside of the scope of the user's obtained LAR access, and in response thereto, conventional LAR management techniques typically require irregular human intervention, which can be time-consuming, error-prone, and resource-intensive.

SUMMARY

Illustrative embodiments of the disclosure provide techniques for determining LAR-related dependency relationships using artificial intelligence techniques.

An exemplary computer-implemented method includes obtaining data pertaining to multiple actions performed across one or more software applications by one or more user devices. Also, the method includes determining one or more action dependency relationships associated with at least one action performed by a given one of the one or more user devices in connection with a given one of the one or more software applications, by processing at least a portion of the obtained data using one or more artificial intelligence techniques. The method additionally includes modifying one or more LARs, granted for the given user device, to permit access to the given user device to perform one or more actions in connection with at least one of the one or more software applications in accordance with the one or more determined action dependency relationships. Further, the method includes performing one or more automated actions based at least in part on the modifying of the one or more LARs.

Illustrative embodiments can provide significant advantages relative to conventional LAR management techniques. For example, problems associated with such time-consuming, error-prone, and resource-intensive techniques are overcome in one or more embodiments through automatically determining LAR-related dependency relationships using artificial intelligence techniques and modifying LAR access in accordance therewith.

These and other illustrative embodiments described herein include, without limitation, methods, apparatus, systems, and computer program products comprising processor-readable storage media.

BRIEF DESCRIPTION OF THE DRAWINGS

FIG. 3 shows example pseudocode for implementing one or more decision trees in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
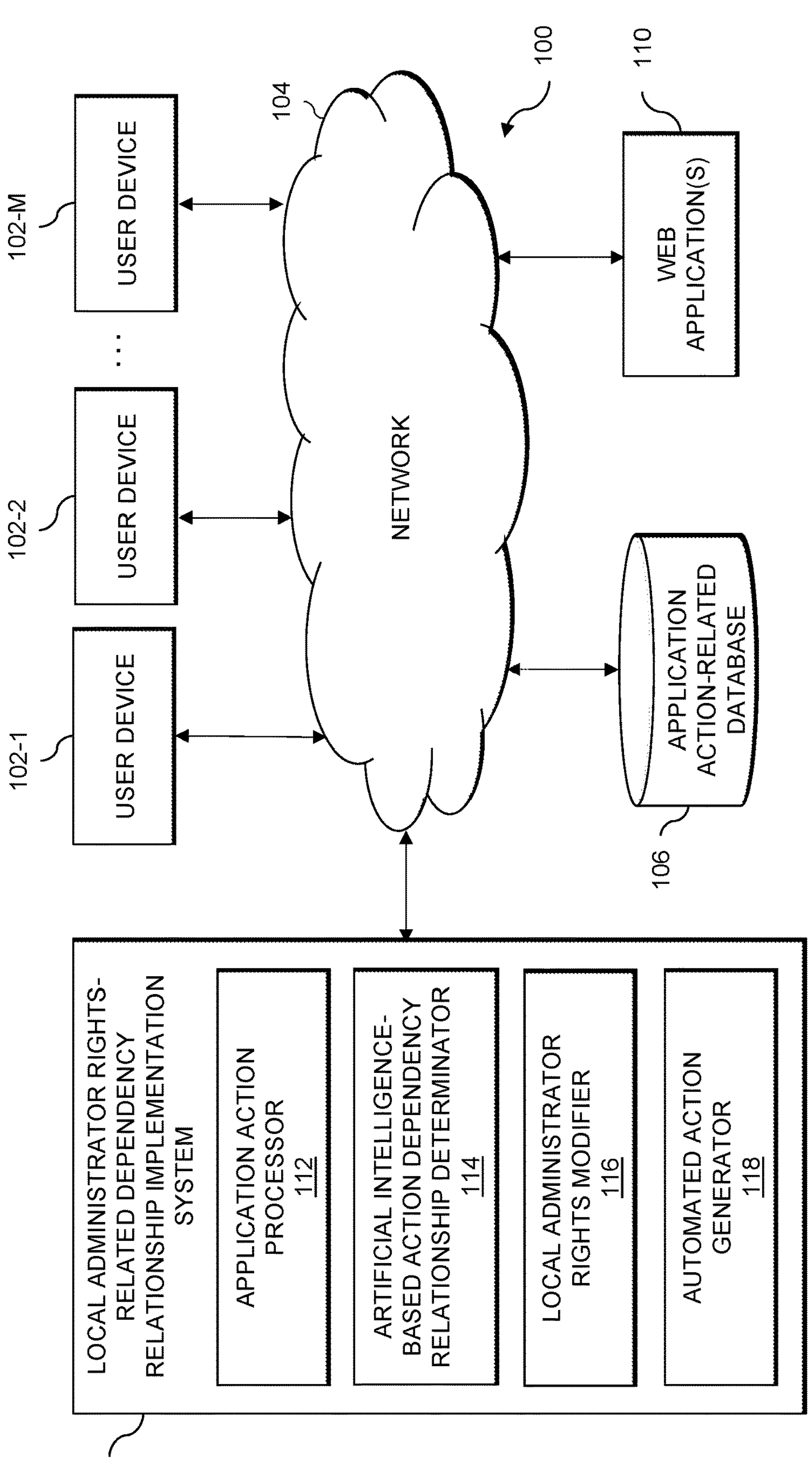
FIG. 1 shows an information processing system configured for determining LAR-related dependency relationships using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is LAR-related dependency relationship implementation system 105 and one or more web applications 110 (e.g., one or more development environment applications, one or more web browsers, one or more communication applications, etc.).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the LAR-related dependency relationship implementation system 105 can have an associated application action-related database 106 configured to store data pertaining to actions performed in connection with multiple software applications, which can include application data, temporal data, user device data, associated LAR-related data, etc.

The application action-related database 106 in the present embodiment is implemented using one or more storage systems associated with the LAR-related dependency relationship implementation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the LAR-related dependency relationship implementation system 105 are one or more input-output devices, which illustratively comprise keyboards, displays or other types of input-output devices in any combination. Such input-output devices can be used, for example, to support one or more user interfaces to the LAR-related dependency relationship implementation system 105, as well as to support communication between the LAR-related dependency relationship implementation system 105 and other related systems and devices not explicitly shown.

Additionally, the LAR-related dependency relationship implementation system 105 in the FIG. 1 embodiment is assumed to be implemented using at least one processing device. Each such processing device generally comprises at least one processor and an associated memory, and implements one or more functional modules for controlling certain features of the LAR-related dependency relationship implementation system 105.

More particularly, the LAR-related dependency relationship implementation system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the LAR-related dependency relationship implementation system 105 to communicate over the network 104 with the user devices 102, and illustratively comprises one or more conventional transceivers.

The LAR-related dependency relationship implementation system 105 further comprises application action processor 112, artificial intelligence-based action dependency relationship determinator 114, LAR modifier 116, and automated action generator 118.

It is to be appreciated that this particular arrangement of elements 112, 114, 116 and 118 illustrated in the LAR-related dependency relationship implementation system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for determining LAR dependency relationships using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of LAR-related dependency relationship implementation system 105, web application(s) 110, and application action-related database 106 can be on and/or part of the same processing platform.

An exemplary process utilizing elements 112, 114, 116 and 118 of an example LAR-related dependency relationship implementation system 105 in computer network 100 will be described in more detail with reference to the flow diagram of FIG. 4.

Accordingly, at least one embodiment includes determining LAR dependency relationships using artificial intelligence techniques. As detailed herein, such an embodiment can include reducing and/or minimizing the need for human intervention with respect to LAR management while maintaining temporal urgency in connection with one or more tasks. Additionally or alternatively, if human intervention is required, one or more embodiments include directing such intervention in an enhanced manner, wherein one or more messages are generated and output to one or more specific users, and wherein such messages include imperative language with limited use (e.g., no use) usage of jargon and/or ambiguous terminology.

By way merely of example, consider a scenario wherein a user has installed, upon receiving LAR access, various applications from an enterprise suite of applications on one or more of the user's devices. In such a scenario, at least one embodiment includes identifying at least one action against one or more events in connection with one of the applications. Based at least in part on the identification of the at least one action, such an embodiment can also include determining and/or discovering one or more appropriate actions to be carried out in connection with the application in question and/or one or more other applications (e.g., one or more applications related to the application in question).

Accordingly, one or more embodiments include automatically learning and/or understanding the intent and/or behavior of a given LAR-related user based at least in part on such events, and preemptively enabling and/or providing the user with data (e.g., enhanced LAR access) pertaining to one or more operations and/or actions related to the events.

By way merely of example, consider the following. When a .NET developer installs an integrated development environment (IDE) such as, e.g., Visual Studio, with LAR access, the developer may need additional .NET libraries to begin their work. Using conventional approaches, the developer has to manually search and identify all of the dependent libraries required to start their work, at least a portion of which may not be accessible under the provided LAR. As such, one or more embodiments include determining which additional and/or dependent libraries may be required for the developer's work, and preemptively granting the developer with enhanced and/or elevated LAR access which encompass the downloading and installation of the additional and/or dependent libraries. Additionally or alternatively, such an embodiment can include automatically triggering and/or initiating the downloading and installation of the additional and/or dependent libraries.

Additionally, as detailed above and herein, at least one embodiment includes determining and/or identifying one or more potential and/or appropriate actions to be carried out on one or more additional applications (e.g., one or more applications related to a given application associated with existing LAR access and/or a given user activity). For example, once a user gains and/or is granted elevated LAR access in accordance with one or more embodiments, the following actions could be performed. A developer, for instance, might have taken LAR access to install or perform Activity A, but the developer might also and/or subsequently require that one or more other activities (e.g., activities not encompassed by the original LAR) be accomplished first. As part of action discovery, at least one embodiment includes automatically predicting and/or determining such other activities for the developer.

Such an embodiment can include, for example, monitoring what one or more applications are doing by registering with the operating system (OS) and monitoring one or more OS logs, as well as monitoring what one or more users are doing in the application(s) by intercepting controls and messages through the system's visual interface. Additionally, such an embodiment can include connecting to where the application(s) store their historical logs and analyzing the logs to determine historical actions. The one or more applications can also be categorized and/or assigned into one or more groups such as, e.g., web browsers, development tools, etc., to further facilitate such monitoring and/or learning. Further, in at least one embodiment, a list of action words associated with each type of application can be generated and/or implemented to additionally facilitate such monitoring and/or learning. One or more embodiments can also include creating and/or implementing one or more decision trees in connection with such monitoring and/or learning, wherein using the one or more decision trees includes mapping out how the application(s) perform given actions in different steps, particularly when special access is required. Utilization of the one or more decision trees can result in determinations such as, for example, workflow-related determinations (e.g., certain actions in one step can trigger one or more actions in other steps). Also, at least one embodiment includes combining decision trees from similar users to create a more comprehensive view, which can facilitate learning information with respect to new users and/or existing users adapting to one or more changes.

Also, different users may utilize different combinations of tools in various ways. For example, a developer might have been granted LAR access to install Application 1, but might also require that one or more separate and/or additional activities be accomplished first, wherein such activities are not covered by the granted LAR access. Accordingly, one or more embodiments can include automatically predicting such actions and providing enhanced and/or elevated LAR access corresponding thereto.

For example, consider a scenario wherein a user has been granted LAR access to install Python on a given device. Recognizing the need for one or more Python packages, at least one embodiment includes identifying and/or determining if a Python package installer (pip) is already installed on the given device. If not, such an embodiment can include providing instructions for installing a pip, as well as enhanced and/or modified LAR access which covers such a pip installation.

By way of additional example, consider a scenario wherein a user has been granted LAR access to install a JavaScript runtime environment such as Node.js on a given device. Recognizing the need for a node package manager (NPM) for managing JavaScript packages, at least one embodiment includes identifying and/or determining if an NPM is installed on the given device. If not, such an embodiment can include providing instructions for installing an NPM, as well as enhanced and/or modified LAR access which covers such an NPM installation.

By way of further example, consider a scenario wherein a user has been granted LAR access to install an IDE tool (e.g., Visual Studio) on a given device. At least one embodiment includes determining that installing the IDE tool alone is not sufficient for starting the user's development work, particularly with respect to .NET projects. Such a determination can be carried out, for example, by subscribing to and monitoring relevant events from the given OS. For instance, when the user interacts with an application, opens a file, or performs one or more other types of specific actions, these events will be captured and logged. By plugging into one or more graphical user interface (GUI) software development kits (SDKs) of the OS, at least one embodiment can include intercepting controls and messages sent by applications, which facilitates the capturing and/or processing of user inputs, interactions, and/or actions within the applications.

Additionally or alternatively, one or more embodiments can include connecting to the log storage mechanisms used by one or more applications. Examining the application logs can provide insights into the user's activities and actions performed within the applications. Further, at least one embodiment can include employing one or more context-awareness mechanisms that take into account the user's context, such as, e.g., currently open applications, active windows, recently accessed files, etc. Such information can facilitate learning and/or understanding the user's current work context. Also, one or more embodiments can include integrating with one or more productivity tools and/or software that provide information about the user's tasks. For example, integration with one or more project management tools can offer insights into the user's ongoing project-related activities.

By way merely of example and illustration, consider a scenario wherein, in addition to the IDE tool (e.g., Visual Studio), a user will need to set up the development environment, which includes installing necessary frameworks and tools. For .NET development, e.g., the user will likely need to install components including a .NET framework and/or .NET core, C#language support, a package manager, and one or more IDE plugins. Accordingly, having determined this information, at least one embodiment includes providing instructions for installing the above-noted necessary frameworks and tools, as well as enhanced and/or modified LAR access which covers such installations.

Also, for example, consider a scenario wherein a user has been granted LAR access to install a code analysis tool (e.g., SonarQube) on a given device. At least one embodiment includes determining that minimum system requirements must be met, in connection with the given device, before installing the code analysis tool. For instance, one such requirement might include installing Java. Accordingly, having determined this information, at least one embodiment includes providing instructions for installing Java and/or updating to the latest version of Java (if already installed on the given device), as well as enhanced and/or modified LAR access which covers such actions.

As further detailed herein, one or more embodiments can include creating one or more automated workflows. For example, notifications from one application can trigger a required operation on another application. As such, at least one embodiment can include predicting and/or preemptively identifying such an operation and creating at least one workflow for one or more relevant users to automatically perform the necessary step(s) and/or action(s) to carry out the operation. For instance, a context may arise wherein raising a service ticket using a first application triggers an example embodiment to create an automated workflow which includes obtaining automatic approval for a part replacement (related to the service ticket), and downloading sales material as well as a competitive analysis for a newly launched consumer product for a consumer sales personnel associated with the part. This can be achieved by creating personas of users, wherein at least one embodiment can include discovering and recommending activities (e.g., best-fit activities) and actions alongside an elevated LAR access instance corresponding thereto.

Creating user personas can include, for example, collecting data on user behaviors, user preferences, and/or user actions across different applications. Such data can include, e.g., the frequency of application usage, the types of tasks performed, any patterns in user interactions, etc. Pattern recognition techniques can be used to identify such patterns and/or trends in the collected data. For example, such an embodiment can include recognizing that certain users tend to use specific applications together and/or that certain users commonly follow a particular sequence of actions. Additionally, one or more embodiments can include utilizing and/or implementing one or more clustering algorithms to group users with similar behavior (e.g., determined based at least in part on the above-noted patterns) into clusters. Users within the same cluster can share one or more common characteristics in terms of how they use applications, the types of tasks they perform, their preferences, etc.

Such clustering can include performing feature engineering on at least a portion of the data. For example, one or more relevant features and/or attributes can be defined based on user behavior (e.g., the time of day the user is most active, the applications most frequently used by the user, commonly performed actions, etc.). Additionally, at least one embodiment can include training one or more predictive machine learning models (e.g., one or more regression models) using at least a portion of the engineered features, wherein the model(s) learn(s) to predict one or more user behaviors based at least in part on identified patterns and clustering. Further, one or more embodiments include training one or more such models to create one or more user personas. In such an embodiment, each persona represents a distinct user segment with one or more specific characteristics, preferences, and/or behavioral patterns. For example, user personas might include "Developers," who use coding applications frequently, or "Office Workers," who primarily use productivity tools, etc.

Accordingly, one or more embodiments include performing action discovery across multiple applications. An objective of such an embodiment includes tracking actions performed by applications installed on a given user device, including web browsers and various software applications. In one or more embodiments, such tracking can include, e.g., registering with one or more OS channels associated with the given user device, and monitoring transactions and/or logs generated by the applications associated therewith. This can also include setting-up monitoring capabilities to track such transactions and/or logs by subscribing to one or more relevant system events and/or logging mechanisms provided by the OS.

Additionally or alternatively, tracking can include implementing at least one plugin to one or more GUI SDKs of the OS associated with the given user device to intercept controls and messages sent by one or more of the applications installed thereon and/or utilized thereby. This can facilitate capturing user-entered data and gathering additional information about the actions performed in association therewith. Further, in one or more embodiments, tracking can include implementing at least one plugin to one or more log storage mechanisms used by applications installed on the given user device to store historical log information. This can enable access to analyze application logs, gaining insights into the actions performed by the applications. Also, such an embodiment can include implementing at least one mechanism to control the resolution or level of detail captured in the logs, allowing adjustment to the granularity as needed.

At least one embodiment can also include categorizing applications (e.g., available applications) into groups in accordance with one or more bases. For example, developer studio applications (e.g., Visual Studio, Eclipse, and Xcode) can be categorized under as "IDEs," while web browsers (e.g., Firefox, Edge, Opera, and Chrome) can be categorized as "web browsers." Such categorization allows and/or facilitates actions performed in connection with one application being extended to one or more other applications within the same category. Also, for at least one standard set of operations (e.g., install software, search, etc.), there can be common application programming interfaces (APIs) that can work across applications. At least one embodiment can include implementing such common APIs for such standard operations. When different applications within the same category (e.g., web browsers or IDEs) share common APIs, such commonalties can facilitate the applications working together in a more seamless fashion. This can be particularly beneficial, for example, in scenarios wherein different applications need to work together such as, e.g., for building extensions and/or plugins that interact with multiple applications.

Additionally, one or more embodiments include creating and/or updating at least one action verb dictionary containing action verbs (e.g., replace, reinsert, reseat, reboot, restart, insert, export, secure) associated with one or more respective technologies. By way merely of illustration, assume a scenario wherein there are approximately 100-200 action words specific to a given technology, and different enterprises and/or competitors may use different words to describe certain actions, but words used within the same technology are unambiguous due to usability and design principles.

Also, some verbs can be associated with one or more tags, which can be incorporated into one or more outputs in accordance with one or more embodiments. By way of illustration, consider a scenario wherein actions related to computer systems are being managed. Such management can include, in one or more embodiments, creating and/or implementing an action verb dictionary that lists action words and associates the action words with specific technologies. Such a dictionary might include, for example, the following entries: (i) replace: associated with hardware technologies; (ii) reinsert, reseat: related with dealing with components such as memory or cards; (iii) reboot, restart: associated with system rebooting; (iv) insert, export: pertaining to data management or file operations; and (v) secure: relating to enhancing system security. Such a dictionary can help to standardize terms within a technology domain, improving clarity and consistency.

By way of further example, in one or more contexts, actions including terms such as "is in normal state" and "is operational" can be associated with desired end states. In such contexts, these actions can be tagged as "success" and/or "final." Additionally or alternatively, in at least one context, actions including terms such as "failed," "is not working," "is not optimal," and/or "exceeded warning threshold" are associated with non-operational states and can be tagged as "failed" and/or "final." By way of further example, actions related to lifecycle operations (e.g., actions such as install, create, delete, remove, set, modify, update, replace, etc.) can be tagged as "lifecycle." Also, some actions may require the execution of one or more tools (e.g., "run the command-line utility tool, run the task automation script, etc.), and such actions be associated with the tag "script," and the actual script portion can be extracted into the tag "execute."

Additionally or alternatively, one or more embodiments include performing entity-based action pattern discovery, wherein the methodology is same as the action-based discovery detailed above except that the first grouping is carried out according to the entity (e.g., object, user, device, etc.).

Further, in at least one embodiment, the outputs of such discoveries (e.g., action-based and/or entity-based) can result in the creation of one or more decision trees that illustrate how actions are performed across different steps when elevated and/or modified LAR access is required. In such an embodiment, the decision trees may exhibit various transitions, such as actions triggered by one or more events. By way of example, using one or more gradient boosting algorithms (e.g., CatBoost modeling), at least one embodiment can include determining how different user roles (e.g., entities) interact with a software application, considering categorical attributes such as user roles, permissions, etc. By way of further example, when a new user joins a team or installs a given IDE, a random forest model can be used to process relevant features associated with the new user to predict the likelihood of this user needing one or more additional .NET libraries based at least in part on one or more patterns learned by the model throughout its training.

By way of additional example, when an event arises in connection with a first application, an example decision tree can include a transition to an action which includes automatically performing a particular and/or appropriate action (e.g., search and download competition material) on a second application. By way of further example, a decision tree can also depict a cascading workflow, wherein a certain notification arising from a first step leads to one or more other workflows on at least one different set of steps.

Additionally or alternatively, one or more embodiments can include obtaining and/or utilizing decision trees across similar users (or user personas) and leveraging such decision trees to derive at least one more comprehensive decision tree. Such a decision tree could then be utilized to assist in user-related tasks such as, for example, onboarding new employees and/or users, familiarizing existing users with new workflows, etc. Such a comprehensive decision tree can provide tailored guidance for, e.g., installing a given application with one or more additional features to a new user based at least in part on the user's role(s), responsibilities, and/or similarities with existing users. When there are updates and/or changes in particular workflows, such a comprehensive decision tree can also serve as a guide for existing users, whereby the users can use the comprehensive decision tree as a self-service tool, instead of relying on external resources and/or external support.

In at least one embodiment, whenever a new action is detected, relevant decision trees are examined and the next state(s) can be predicted according to the current state. By way of illustration, consider an example embodiment wherein a first decision tree represents a standard .NET library installation process during an IDE setup, and a second decision tree focuses on user behavior and collaborative patterns within a given team. Within this example, assume that a current state includes a user in the process of installing the IDE for a .NET development project, and a detected new action includes the user indicating the intent to customize the installation settings. In this scenario, an example embodiment can include examining the first decision tree, related to the standard .NET library installation process during IDE setup, while also considering the second decision tree, which analyzes team collaboration patterns. Based at least in part on the analysis of the second decision tree, such an embodiment can include noting and/or determining that everyone in the user's team has already installed the necessary .NET libraries during their IDE installations.

Once the next state is performed by the user (e.g., search, download, etc.), it is also recorded as a user action to retrain the algorithm. By way of illustration, consider the example embodiment above wherein, based at least in part on the analysis of the second decision tree, it is noted and/or determined that everyone in the user's team has already installed the necessary NET libraries during their IDE installations. Further assume, however, that a recognition is made that the user is indicating a preference for .NET Core. In such a scenario, at least one embodiment can include predicting that, given the user's choice and potential differences in team preferences, the next state could involve options specific to a .NET Core library installation. The user's action and corresponding outcome can then be recorded, specifically noting the preference for the .NET Core libraries during installation. Additionally, this new data can be combined with the existing dataset used to train the original random forest model, and the new data can be labeled with the correct outcome, indicating the choice of .NET Core libraries. Further, the example embodiment can then include reinitializing and/or creating a new instance of the random forest model, and retraining the model using the combined and labeled dataset.

Such an example as detailed above illustrates how one or more embodiments can include adapting predictions based at least in part on the user's choice of .NET Core libraries, even if the majority of the team has installed the .NET Framework. The retraining process ensures that the model learns from this new scenario, improving its ability to predict and guide future users with similar preferences.

As detailed herein, one or more embodiments include detecting and/or creating correlations across related events across one or more applications based at least in part on user actions and related LAR access. Such an embodiment can include learning possible actions across different operations on a given application on a user device, and automating performance of at least a portion of those possible actions (e.g., for benefit of the user). Such learning can include, for example, identifying actions not just related to specific applications but, because of generalization into categories, enabling automated responses to future new entities that belong to the same category. At least one embodiment also includes determining and/or identifying similar and/or common ways in which users within a given set and/or enterprise utilize one or more particular applications with respect to LAR, and recommending one or more ways to run through at least one workflow based at least in part on user activity.

By way of example, in a scenario wherein a user has installed multiple applications from an enterprise suite onto a given device, and upon receiving a particular LAR access, at least one embodiment includes identifying one or more appropriate actions in response to events occurring within one of the applications as well as recognizing and/or discovering one or more appropriate actions to be carried out in one or more other related applications. Further, if one or more such appropriate actions fall outside of the scope of the initial particular LAR access, at least one embodiment includes modifying and/or elevating the LAR access granted to the user to cover at least a portion of the one or more appropriate actions.

Accordingly, such an embodiment can include improving the productivity and/or efficiency of users as well as application usage. For example, such an embodiment can include automatically initiating and/or performing one or more predicted and/or identified operations associated with user activity on at least one given application, as well as preemptively enabling, via providing modified and/or elevated LAR access, the user to perform such predicted and/or identified operations.

Figure 2:
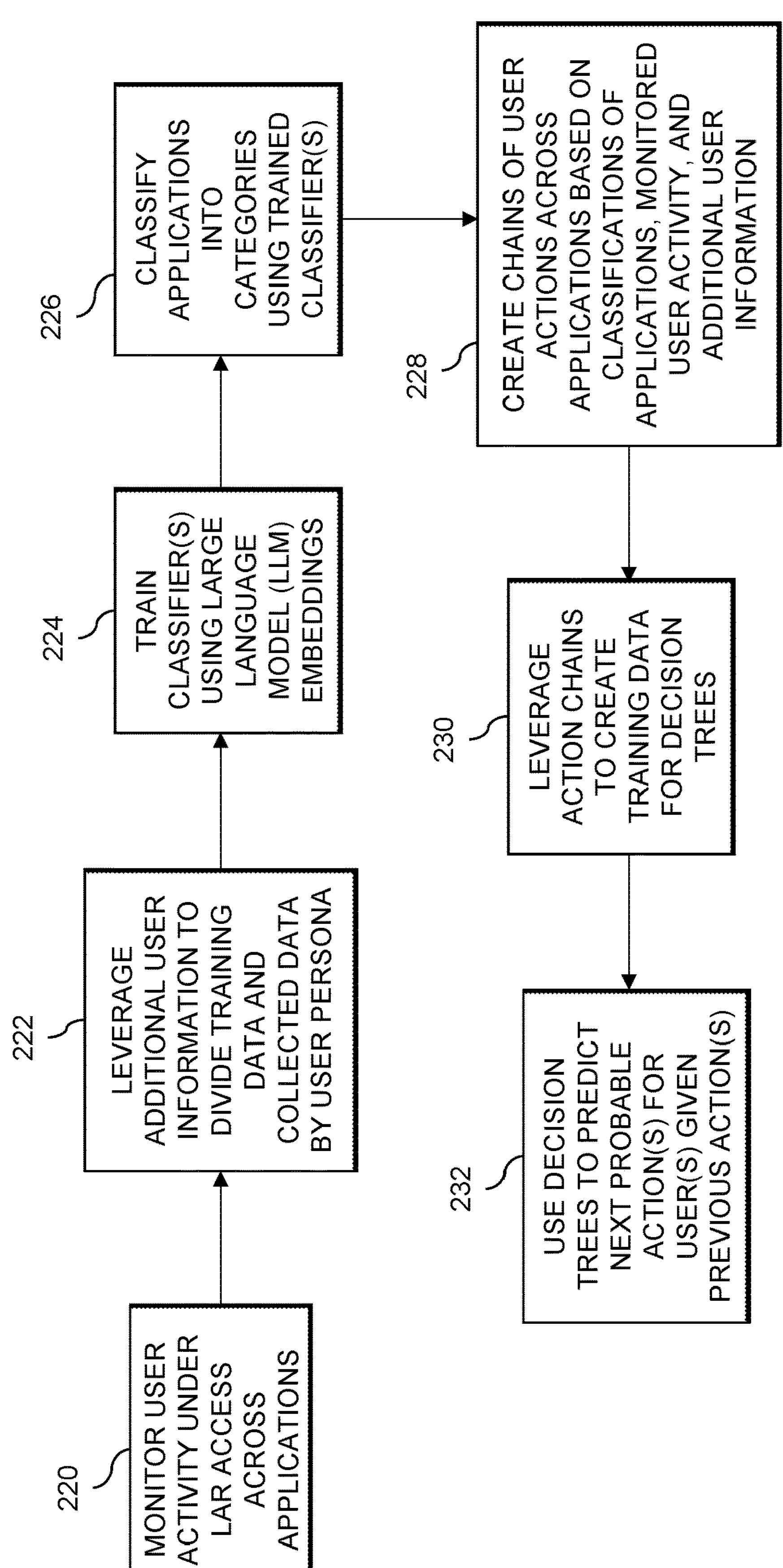
FIG. 2 shows an example workflow diagram for determining LAR-related dependency relationships using artificial intelligence techniques in an illustrative embodiment.

FIG. 2 shows an example workflow diagram for determining LAR-related dependency relationships using artificial intelligence techniques in an illustrative embodiment. By way of illustration, step 220 includes monitoring user activity under LAR access across multiple applications. Step 222 includes leveraging additional user information (e.g., user job function, user job family, user team, etc.) to divide training data and collected data by user persona. Also, step 224 includes training one or more classifiers using large language model (LLM) embeddings (e.g., using the LLM embeddings to gather one or more training features), and step 226 includes classifying at least a portion of the applications into categories (e.g., web browser, development environments, etc.) using the one or more trained classifiers.

As also illustrated in FIG. 2, step 228 includes creating chains of user actions across the applications based at least in part on the classifications of the applications, the monitored user activity data, and/or the additional user information. Additionally, step 230 includes leveraging the action chains to create training data for one or more decision trees, and step 232 includes using the one or more decision trees (e.g., post-training) to predict the next probable action(s) for a particular user (e.g., the user for whom activity was monitored in step 220) given the previous action(s) of the user. As further detailed herein, based at least in part on the predicted next action(s), one or more embodiments can include granting and/or modifying LAR access to the user to facilitate and/or enable user execution of the next action(s).

FIG. 3 shows example pseudocode for implementing one or more decision trees in an illustrative embodiment. In this embodiment, example pseudocode 300 is executed by or under the control of at least one processing system and/or device. For example, the example pseudocode 300 may be viewed as comprising a portion of a software implementation of at least part of LAR-related dependency relationship implementation system 105 of the FIG. 1 embodiment.

The example pseudocode 300 illustrates steps of collecting raw logs of user activity, and preprocessing and/or cleaning the user activity logs to create a chain of user actions. Additionally, for each user in a given group or team, a subsequent step includes recovering a chain of user actions across at least a portion of the corresponding and/or relevant group/team. Also, example pseudocode 300 illustrates creating N-gram combinations using the chain of user actions in a given temporal window (e.g., a two minute to five minute window). The combinations can then be split further based at least in part on user persona(s). Further, example pseudocode 300 illustrates creating a consolidated list of chained user actions such as, e.g., Action A→Action B. Example pseudocode 300 also illustrates steps of training a supervised classification model to predict the next one or more probable actions, given the previous action, and using the predicted set of one or more actions to determine corresponding LAR disbursal and/or assignment.

It is to be appreciated that this particular example pseudocode shows just one example implementation of one or more decision trees, and alternative implementations can be used in other embodiments.

Figure 4:
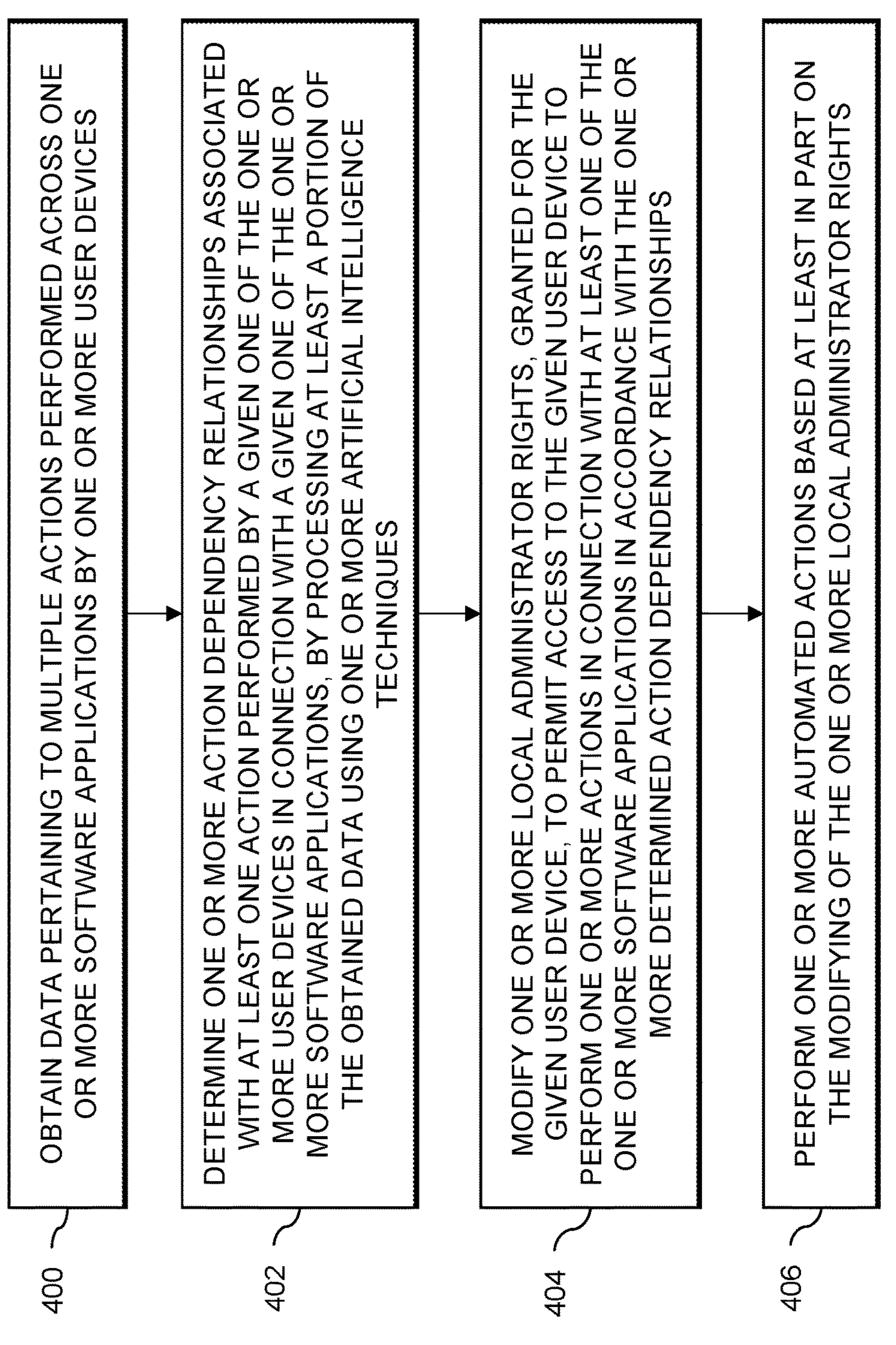
FIG. 4 is a flow diagram of a process for determining LAR-related dependency relationships using artificial intelligence techniques in an illustrative embodiment.

FIG. 4 is a flow diagram of a process for determining LAR-related dependency relationships using artificial intelligence techniques in an illustrative embodiment. It is to be understood that this particular process is only an example, and additional or alternative processes can be carried out in other embodiments.

In this embodiment, the process includes steps 400 through 406. These steps are assumed to be performed by LAR-related dependency relationship implementation system 105 utilizing elements 112, 114, 116 and 118.

Step 400 includes obtaining data pertaining to multiple actions performed across one or more software applications by one or more user devices. In at least one embodiment, obtaining data pertaining to multiple actions includes tracking actions performed across the one or more software applications installed on at least a portion of the one or more user devices by registering with one or more operating system channels associated with the at least a portion of the one or more user devices, and monitoring log data generated by the one or more software applications associated the one or more operating system channels. Additionally or alternatively, obtaining data pertaining to multiple actions can include subscribing to at least one of one or more system events and one or more logging mechanisms provided by at least one operating system associated with at least a portion of the one or more user devices.

Further, in at least one embodiment, obtaining data pertaining to multiple actions includes processing messages sent in connection with at least a portion of the one or more software applications by implementing at least one plugin to one or more GUI SDKs of at least one operating system associated with at least a portion of the one or more user devices. Also, obtaining data pertaining to multiple actions can include processing historical log data associated with at least a portion of the one or more software applications by implementing at least one plugin to one or more log storage mechanisms used by the at least a portion of the one or more software applications installed on the one or more user devices.

Step 402 includes determining one or more action dependency relationships associated with at least one action performed by a given one of the one or more user devices in connection with a given one of the one or more software applications, by processing at least a portion of the obtained data using one or more artificial intelligence techniques. In one or more embodiments, determining the one or more action dependency relationships includes processing the at least a portion of the obtained data using one or more supervised learning-based decision tree algorithms. Additionally or alternatively, determining the one or more action dependency relationships can include identifying at least one action to be performed in connection with one or more additional ones of the one or more software applications in association with performance of the at least one action performed by the given user device in connection with the given one of the one or more software applications.

Step 404 includes modifying one or more local administrator rights, granted for the given user device, to permit access to the given user device to perform one or more actions in connection with at least one of the one or more software applications in accordance with the one or more determined action dependency relationships. In at least one embodiment, modifying one or more local administrator rights granted for the given user device includes granting one or more additional local administrator rights for the given user device to perform at least a portion of the one or more actions in connection with at the least one of the one or more software applications in accordance with the one or more determined action dependency relationships.

Step 406 includes performing one or more automated actions based at least in part on the modifying of the one or more local administrator rights. In one or more embodiments, performing one or more automated actions includes generating one or more workflows comprising instructions for carrying out, in association with the modifying of the one or more local administrator rights, at least a portion of the one or more actions in connection with at the least one of the one or more software applications in accordance with the one or more determined action dependency relationships. Additionally or alternatively, performing one or more automated actions can include automatically training at least a portion of the one or more artificial intelligence techniques using feedback related to the modifying of the one or more local administrator rights. Further, in one or more embodiments, performing one or more automated actions can include automatically performing actions related, for example, granting one or more particular users with enhanced and/or elevated LAR access in accordance with the modifications to the original LAR, and/or automatically triggering and/or initiating the downloading and installation, on the given user device, of one or more additional and/or dependent software applications and/or software libraries, in accordance with the modifications to the LAR.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to determine LAR dependency relationships using artificial intelligence techniques. These and other embodiments can effectively overcome problems associated with such time-consuming, error-prone, and resource-intensive conventional techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
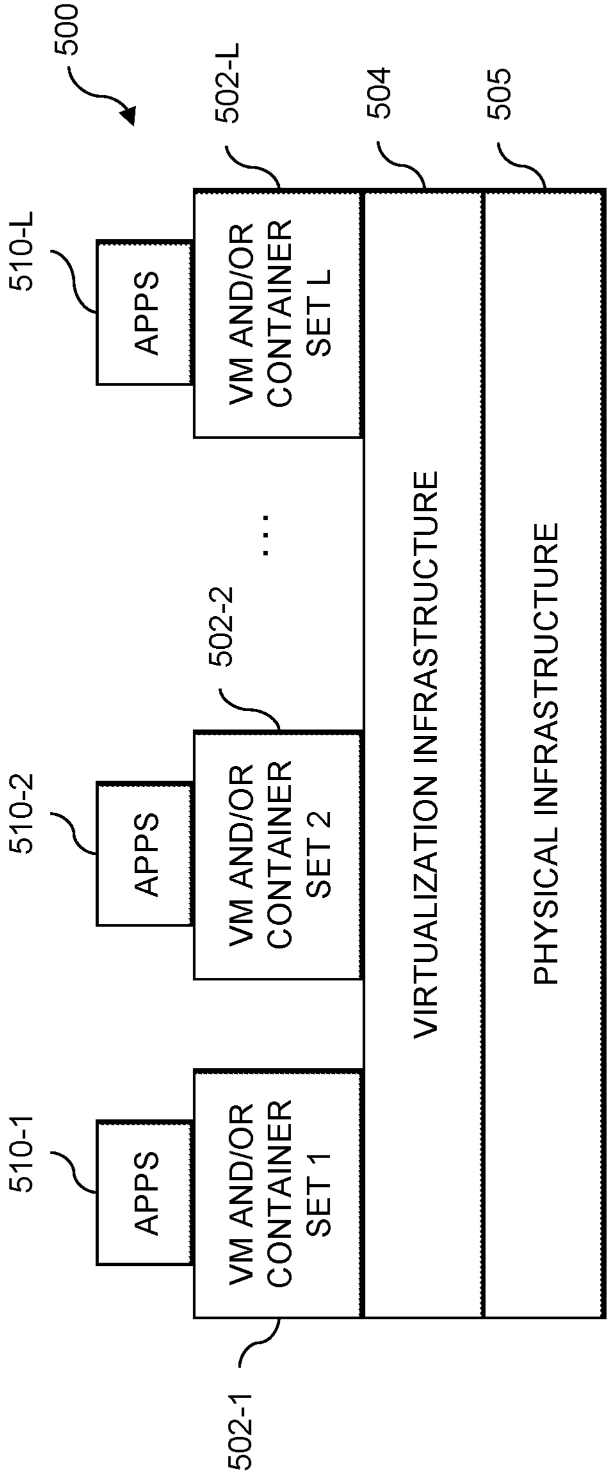
FIGS. 5 and 6 show examples of processing platforms that may be utilized to implement at least a portion of an information processing system in illustrative embodiments.
Figure 6:
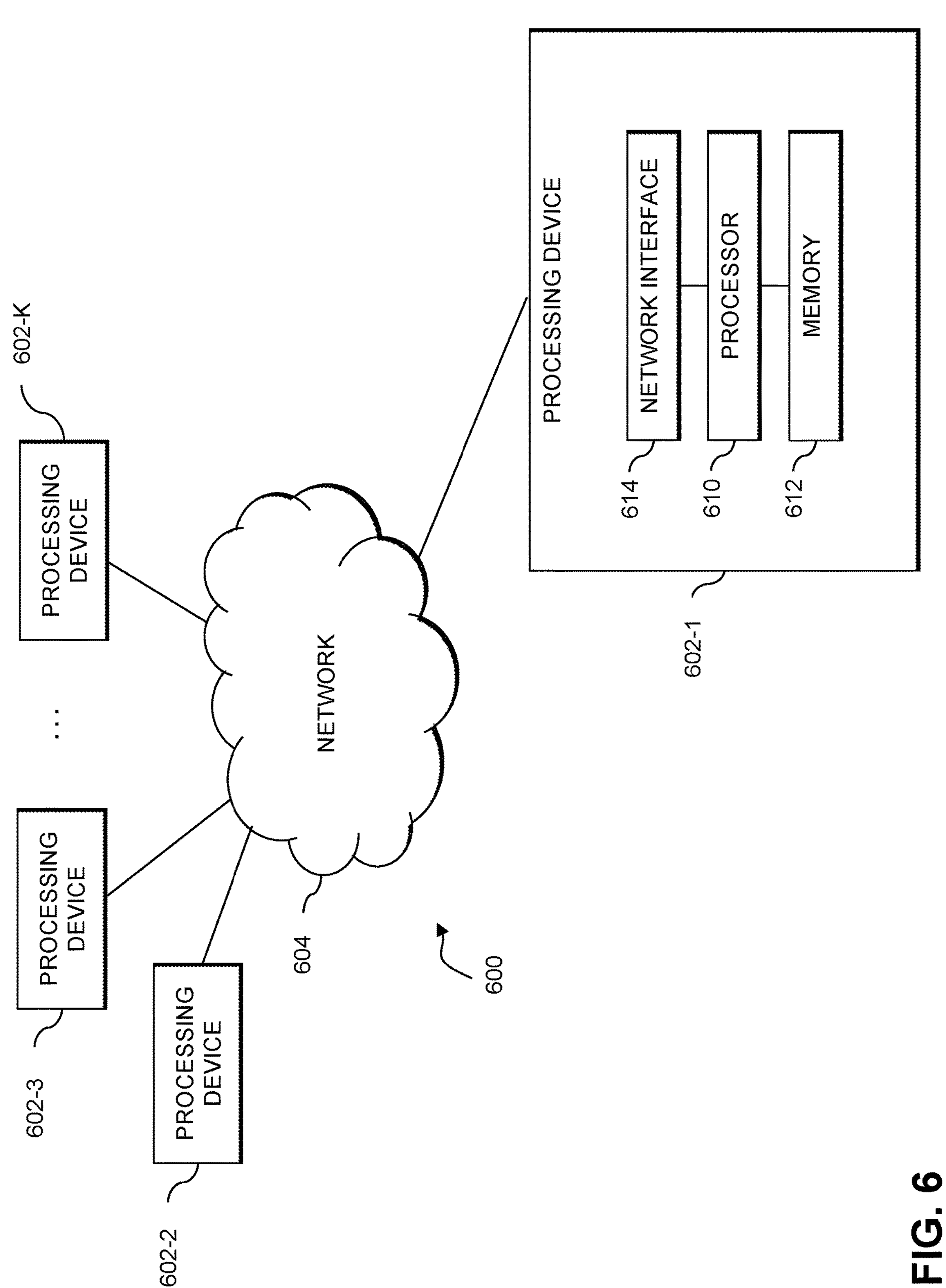

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more information processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a CPU, a GPU, a TPU, a microcontroller, an ASIC, a FPGA or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining data pertaining to multiple actions performed across one or more software applications by one or more user devices;

determining one or more action dependency relationships associated with actions performed by a given one of the one or more user devices in connection with a given one of the one or more software applications, by processing, using a processor-based machine learning system including a classifier and one or more decision tree models, at least a portion of the obtained data, the processing comprising:

processing, by the classifier, trained using large language model (LLM) embeddings, the at least a portion of the obtained data to classify the one or more software applications into one or more categories;

generating, at an output of the classifier, application category data related to the one or more categories;

processing, using the processor-based machine learning system, the application category data and user device activity data to create one or more chains of user device actions across the one or more classified software applications; and processing, at an input of the one or more decision tree models, the one or more chains of user device actions to generate, at an output of the one or more decision tree models, at least one predicted next action for the given user device;

modifying one or more local administrator rights, granted for the given user device, to permit access to the given user device to perform the at least one predicted next action; and performing one or more automated actions based at least in part on the modifying of the one or more local administrator rights;

wherein the method is performed by at least one processing device comprising a processor coupled to a memory.

2. The computer-implemented method of claim 1, wherein performing one or more automated actions comprises generating one or more workflows comprising instructions for carrying out, in association with the modifying of the one or more local administrator rights, the at least one predicted next action.

3. The computer-implemented method of claim 1, wherein modifying one or more local administrator rights granted for the given user device comprises granting one or more additional local administrator rights for the given user device to perform the at least one predicted next action.

4. The computer-implemented method of claim 1, wherein performing one or more automated actions comprises automatically training at least a portion of the classifier using feedback related to the modifying of the one or more local administrator rights.

5. The computer-implemented method of claim 1, wherein obtaining data pertaining to multiple actions comprises tracking actions performed across the one or more software applications installed on at least a portion of the one or more user devices by registering with one or more operating system channels associated with the at least a portion of the one or more user devices, and monitoring log data generated by the one or more software applications associated the one or more operating system channels.

6. The computer-implemented method of claim 1, wherein obtaining data pertaining to multiple actions comprises subscribing to at least one of one or more system events and one or more logging mechanisms provided by at least one operating system associated with at least a portion of the one or more user devices.

7. The computer-implemented method of claim 1, wherein obtaining data pertaining to multiple actions comprises processing messages sent in connection with at least a portion of the one or more software applications by implementing at least one plugin to one or more graphical user interface (GUI) software development kits (SDKs) of at least one operating system associated with at least a portion of the one or more user devices.

8. The computer-implemented method of claim 1, wherein obtaining data pertaining to multiple actions comprises processing historical log data associated with at least a portion of the one or more software applications by implementing at least one plugin to one or more log storage mechanisms used by the at least a portion of the one or more software applications installed on the one or more user devices.

9. A non-transitory processor-readable storage medium having stored therein program code of one or more software programs, wherein the program code when executed by at least one processing device causes the at least one processing device:

to obtain data pertaining to multiple actions performed across one or more software applications by one or more user devices;

to determine one or more action dependency relationships associated with actions performed by a given one of the one or more user devices in connection with a given one of the one or more software applications, by processing, using a processor-based machine learning system including a classifier and one or more decision tree models, at least a portion of the obtained data, the processing comprising:

processing, by the classifier, trained using large language model (LLM) embeddings, the at least a portion of the obtained data to classify the one or more software applications into one or more categories;

generating, at an output of the classifier, application category data related to the one or more categories;

processing, using the processor-based machine learning system, the application category data and user device activity data to create one or more chains of user device actions across the one or more classified software applications; and processing, at an input of the one or more decision tree models, the one or more chains of user device actions to generate, at an output of the one or more decision tree models, at least one predicted next action for the given user device;

to modify one or more local administrator rights, granted for the given user device, to permit access to the given user device to perform the at least one predicted next action; and to perform one or more automated actions based at least in part on the modifying of the one or more local administrator rights.

10. The non-transitory processor-readable storage medium of claim 9, wherein performing one or more automated actions comprises generating one or more workflows comprising instructions for carrying out, in association with the modifying of the one or more local administrator rights, the at least one predicted next action.

11. The non-transitory processor-readable storage medium of claim 9, wherein modifying one or more local administrator rights granted for the given user device comprises granting one or more additional local administrator rights for the given user device to perform the at least one predicted next action.

12. The non-transitory processor-readable storage medium of claim 9, wherein performing one or more automated actions comprises automatically training at least a portion of the classifier using feedback related to the modifying of the one or more local administrator rights.

13. An apparatus comprising:

at least one processing device comprising a processor coupled to a memory;

the at least one processing device being configured:

to obtain data pertaining to multiple actions performed across one or more software applications by one or more user devices;

to determine one or more action dependency relationships associated with actions performed by a given one of the one or more user devices in connection with a given one of the one or more software applications, by processing, using a processor-based machine learning system including a classifier and one or more decision tree models, at least a portion of the obtained data, the processing comprising:

processing, by the classifier, trained using large language model (LLM) embeddings, the at least a portion of the obtained data to classify the one or more software applications into one or more categories;

generating, at an output of the classifier, application category data related to the one or more categories;

processing, using the processor-based machine learning system, the application category data and user device activity data to create one or more chains of user device actions across the one or more classified software applications; and processing, at an input of the one or more decision tree models, the one or more chains of user device actions to generate, at an output of the one or more decision tree models, at least one predicted next action for the given user device;

to modify one or more local administrator rights, granted for the given user device, to permit access to the given user device to perform the at least one predicted next action; and to perform one or more automated actions based at least in part on the modifying of the one or more local administrator rights.

14. The apparatus of claim 13, wherein performing one or more automated actions comprises generating one or more workflows comprising instructions for carrying out, in association with the modifying of the one or more local administrator rights, the at least one predicted next action.

15. The apparatus of claim 13, wherein modifying one or more local administrator rights granted for the given user device comprises granting one or more additional local administrator rights for the given user device to perform the at least one predicted next action.

16. The apparatus of claim 13, wherein performing one or more automated actions comprises automatically training at least a portion of the classifier using feedback related to the modifying of the one or more local administrator rights.

17. The apparatus of claim 13, wherein obtaining data pertaining to multiple actions comprises tracking actions performed across the one or more software applications installed on at least a portion of the one or more user devices by registering with one or more operating system channels associated with the at least a portion of the one or more user devices, and monitoring log data generated by the one or more software applications associated the one or more operating system channels.

18. The apparatus of claim 13, wherein obtaining data pertaining to multiple actions comprises subscribing to at least one of one or more system events and one or more logging mechanisms provided by at least one operating system associated with at least a portion of the one or more user devices.

19. The apparatus of claim 13, wherein obtaining data pertaining to multiple actions comprises processing messages sent in connection with at least a portion of the one or more software applications by implementing at least one plugin to one or more graphical user interface (GUI) software development kits (SDKs) of at least one operating system associated with at least a portion of the one or more user devices.

20. The apparatus of claim 13, wherein obtaining data pertaining to multiple actions comprises processing historical log data associated with at least a portion of the one or more software applications by implementing at least one plugin to one or more log storage mechanisms used by the at least a portion of the one or more software applications installed on the one or more user devices.

* * * * *